United States Patent
Wang et al.

(10) Patent No.: US 10,255,687 B2
(45) Date of Patent: Apr. 9, 2019

(54) DISTANCE MEASUREMENT SYSTEM APPLICABLE TO DIFFERENT REFLECTING SURFACES AND OPERATING METHOD THEREOF

(71) Applicant: PIXART IMAGING INC., Hsin-Chu County (TW)

(72) Inventors: Guo-Zhen Wang, Hsin-Chu County (TW); Chia-Yi Liu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 275 days.

(21) Appl. No.: 14/935,960

(22) Filed: Nov. 9, 2015

(65) Prior Publication Data

US 2016/0232679 A1    Aug. 11, 2016

Related U.S. Application Data

(60) Provisional application No. 62/112,391, filed on Feb. 5, 2015.

(51) Int. Cl.
*G06T 7/00* (2017.01)
*H04N 5/235* (2006.01)
*H04N 5/225* (2006.01)
*G06T 7/55* (2017.01)
*G01C 3/00* (2006.01)
*G01S 17/46* (2006.01)
*G01S 17/89* (2006.01)

(52) U.S. Cl.
CPC .................. *G06T 7/55* (2017.01); *G01C 3/00* (2013.01); *G01S 17/46* (2013.01); *G01S 17/89* (2013.01); *G06T 2207/10144* (2013.01)

(58) Field of Classification Search
CPC ......... G06T 7/0065; G06T 2207/10028; G06T 2207/10144; H04N 5/2256; H04N 5/2353
USPC .......................................... 348/175; 396/125
See application file for complete search history.

(56) References Cited

U.S. PATENT DOCUMENTS

| 9,251,427 | B1* | 2/2016 | Chu | G06K 9/00221 |
|---|---|---|---|---|
| 2001/0024571 | A1* | 9/2001 | Nakahara | G02B 7/34 |
| | | | | 396/89 |
| 2003/0161506 | A1* | 8/2003 | Velazquez | G06K 9/00228 |
| | | | | 382/118 |
| 2005/0021282 | A1* | 1/2005 | Sammut | F41G 1/38 |
| | | | | 702/150 |
| 2007/0229797 | A1* | 10/2007 | Sugimoto | G01C 3/08 |
| | | | | 356/4.03 |
| 2009/0097725 | A1* | 4/2009 | Krupnik | A61B 1/00096 |
| | | | | 382/128 |

(Continued)

*Primary Examiner* — Zaihan Jiang
(74) *Attorney, Agent, or Firm* — Hauptman Ham, LLP

(57) ABSTRACT

There is provided an operating method of a distance measurement system including the steps of: successively capturing image frames with an image sensor; controlling a sampling parameter to converge an average brightness value of an object image in the image frames to be within a predetermined range; calculating a plurality of first object sizes of a converged object image in a converged image frame and calculating a first average value of the first object sizes; calculating a second average value of the first average values corresponding to a plurality of converged image frames; and comparing the second average value with a lookup table to determine an object depth.

20 Claims, 5 Drawing Sheets

(56) References Cited

U.S. PATENT DOCUMENTS

| | | | | |
|---|---|---|---|---|
| 2009/0116830 A1* | 5/2009 | Kumagai | ............... | G03B 13/32 |
| | | | | 396/125 |
| 2011/0043806 A1* | 2/2011 | Guetta | ................. | G01S 17/026 |
| | | | | 356/432 |
| 2011/0235905 A1* | 9/2011 | Yokokawa | ......... | H04N 1/40068 |
| | | | | 382/165 |
| 2012/0170808 A1* | 7/2012 | Ogata | ................. | B60R 21/0134 |
| | | | | 382/103 |
| 2012/0308140 A1* | 12/2012 | Ambrus | ............. | G06K 9/00362 |
| | | | | 382/190 |
| 2013/0131473 A1* | 5/2013 | Gu | ........................ | G06F 3/0421 |
| | | | | 600/324 |
| 2014/0328512 A1* | 11/2014 | Gurwicz | .............. | G06K 9/6263 |
| | | | | 382/103 |
| 2015/0077568 A1* | 3/2015 | Tsunematsu | ..... | G08B 13/19645 |
| | | | | 348/159 |
| 2016/0084617 A1* | 3/2016 | Lyren | ....................... | F41G 3/08 |
| | | | | 42/135 |
| 2016/0182969 A1* | 6/2016 | Berry, III | ............... | G06Q 30/00 |
| | | | | 725/36 |
| 2016/0366288 A1* | 12/2016 | Sasa | ................... | H04N 1/00023 |

* cited by examiner

| area I / width I | depth I |
| area II / width II | depth II |
| area III / width III | depth III |
| ⋮ | ⋮ |

$$W1' = \frac{W1+W2+W3}{3}$$

DISTANCE MEASUREMENT SYSTEM APPLICABLE TO DIFFERENT REFLECTING SURFACES AND OPERATING METHOD THEREOF

RELATED APPLICATIONS

The present application is based on and claims priority to U.S. Application Ser. No. 62/112,391, filed Feb. 5, 2015, the disclosure of which is hereby incorporated by reference herein in its entirety.

BACKGROUND

1. Field of the Disclosure

This disclosure generally relates to a distance measuring system and, more particularly, to a distance measuring system applicable to different reflecting surfaces and an operating method thereof.

2. Description of the Related Art

The images captured by an imaging system may have different applications according to different post-processing, e.g. the gesture recognition, proximity sensing and distance measurement.

In an application of the distance measurement, the material of an object to be detected can influence the ability of reflecting incident light thereof to change the parameter, e.g., image brightness and size, of the images captured by the imaging system to cause so-called "depth jitter" during operation thereby degrading the detection accuracy.

Accordingly, a distance measurement system that is not affected by the material of an object to be detected is needed in the art.

SUMMARY

The present disclosure provides a distance measuring system applicable to different reflecting surfaces and an operating method thereof.

The present disclosure further provides a distance measuring system that employs a temporal filtering and/or a spatial filtering and an operating method thereof.

The present disclosure further provides a distance measuring system with a high detection accuracy and an operating method thereof.

The present disclosure provides a distance measurement system including an image sensor, a sampling control module, a spatial filtering module and a depth calculation module. The image sensor is configured to successively capture image frames. The sampling control module is configured to control a sampling parameter to converge an average brightness value of an object image in the image frames to be within a predetermined range. The spatial filtering module is configured to calculate a plurality of object sizes of a converged object image in a converged image frame and calculate an average value of the object sizes. The depth calculation module is configured to compare the average value with a lookup table to determine an object depth.

The present disclosure further provides a distance measurement system including an image sensor, a sampling control module, a temporal filtering module and a depth calculation module. The image sensor is configured to successively capture image frames. The sampling control module is configured to control a sampling parameter to converge an average brightness value of an object image in the image frames to be within a predetermined range. The temporal filtering module is configured to respectively calculate a second object size of a converged object image in each of a plurality of converged image frames and calculate a second average value of the second object sizes. The depth calculation module is configured to compare the second average value with a lookup table to determine an object depth.

The present disclosure further provides an operating method of a distance measurement system. The distance measurement system includes an image sensor. The operating method includes the steps of: successively capturing image frames with the image sensor; controlling a sampling parameter to converge an average brightness value of an object image in the image frames to be within a predetermined range; calculating a plurality of first object sizes of a converged object image in a converged image frame and calculating a first average value of the first object sizes; calculating a second average value of the first average values corresponding to a plurality of converged image frames; and comparing the second average value with a lookup table to determine an object depth.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
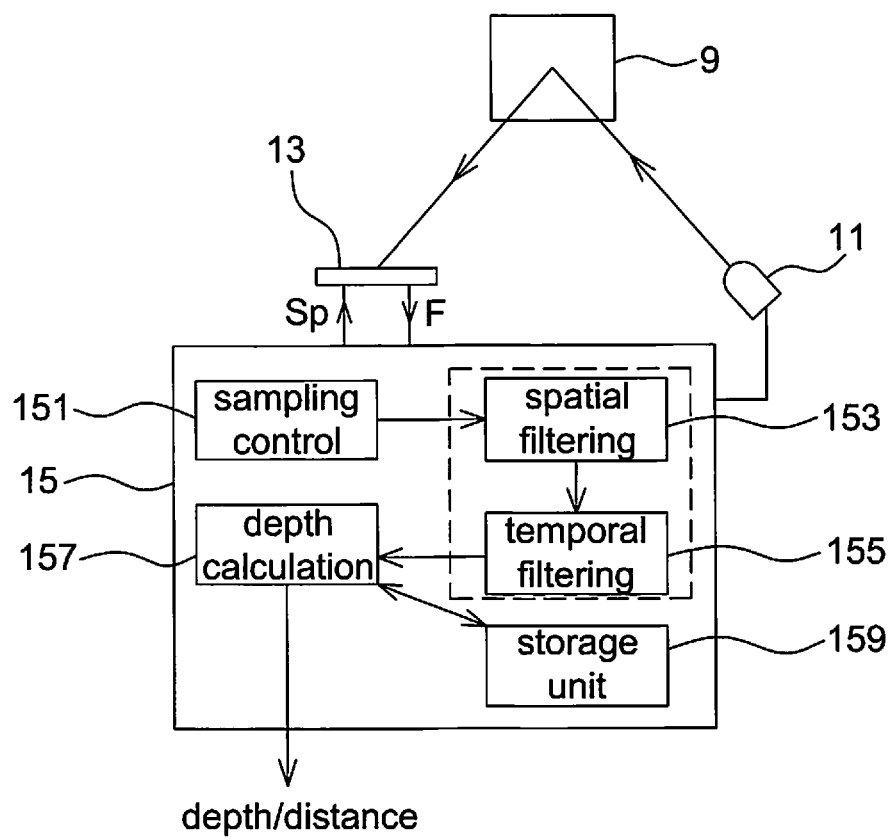
FIG. 1 is a schematic block diagram of a distance measurement system according to an embodiment of the present disclosure.

Referring to FIG. 1, it is a schematic block diagram of a distance measurement system 100 according to an embodiment of the present disclosure. The distance measurement system 100 includes a light source 11, an image sensor 13 and a processor 15, and the distance measurement system 100 is configured to detect a depth of an object 9 to be detected, wherein the depth is referred a distance between the object 9 and the image sensor 13. It should be mentioned that the light source 11 is not necessary to be included in the distance measurement system 100. In some embodiments, the light source 11 is a light source external to the distance measurement system 100.

The light source 11 is, for example, a light emitting diode, a laser diode or other active light sources, and configured to emit an identifiable spectrum (for example, but not limited to, infrared light) to illuminate the object 9. The light source 11 is controlled by the processor 15 to emit light. In some embodiments, the light source 11 and the image sensor 13 are both disposed in a same chip package. In some embodiments, the light source 11 and the image sensor 13 are disposed separately. It is appreciated that when the light source 11 is an external light source, the light source 11 is not coupled to the distance measurement system 100 and operates individually.

The image sensor 13 includes, for example, a CCD image sensor, a CMOS image sensor or other photoelectric conversion devices, and is configured to successively capture and output image frames F by sensing light reflected from the object 9. For example, the image sensor 13 includes a sensor array composed of m×n pixels and configured to sense and output two-dimensional image frames F, wherein m and n are positive integers.

The processor 15 is, for example, a microcontroller (MCU), a central processing unit (CPU) or other processing units for processing image data. The processor 15 includes a sampling control module 151, a spatial filtering module 153, a temporal filtering module 155, a depth calculation module 157 and a storage unit 159. It should be mentioned that although the sampling control module 151, the spatial filtering module 153, the temporal filtering module 155 and the depth calculation module 157 are shown separately to indicate different functions, the functions are all considered to be executed by the processor 15. The sampling control module 151, the spatial filtering module 153, the temporal filtering module 155 and the depth calculation module 157 are implemented by software and/or hardware without particular limitations. The storage unit 159 is, for example, a memory or a buffer, and configured to store a lookup table (as shown in FIG. 5) and parameters and algorithms used in operation.

Figures 4, 5:
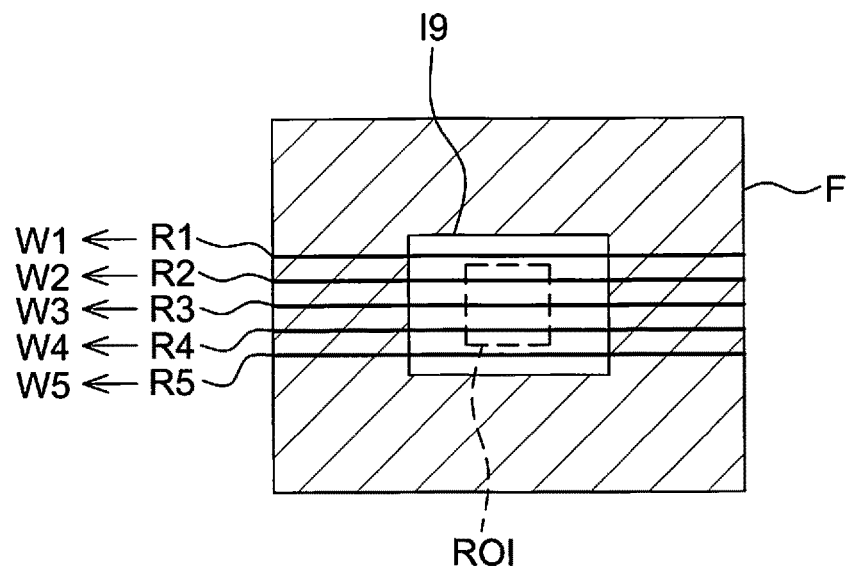
FIG. 4 is a schematic diagram of the spatial filtering of a distance measurement system according to an embodiment of the present disclosure.
FIG. 5 is a schematic diagram of a lookup table of a distance measurement system according to an embodiment of the present disclosure.

The sampling control module 151 is configured to control a sampling parameter Sp to converge an average brightness value of an object image I9 (as shown in FIG. 4) in the image frame F captured by the image sensor 13 to be within a predetermined range or to a predetermined value. For example, in a system using 256 gray levels, the predetermined value is 200 gray levels, and the predetermined range is between 195 and 205 gray levels, but not limited thereto.

Referring to FIG. 4, it is a schematic diagram of the spatial filtering of a distance measurement system according to an embodiment of the present disclosure, wherein the area filled with inclined lines is referred background area. In one embodiment, the sampling control module 151 identifies an object image I9 in an image frame F at first, e.g. identifying a pixel region which has the gray level larger than a gray level threshold as the object image I9, wherein the gray level threshold is a fixed value or a variable value. Next, the sampling control module 151 calculates a total average brightness value of the object image I9, and changes the total average brightness value by adjusting the sampling parameter Sp.

In another embodiment, the sampling control module 151 identifies an object image I9 in an image frame F at first and selects a region of interest ROI in the object image I9 as shown in FIG. 4. In this embodiment, the average brightness value is a local average brightness value of the region of interest ROI. Next, the sampling control module 151 changes the local average brightness value by adjusting the sampling parameter Sp. In one embodiment, the region of interest ROI is a predetermined fixed region corresponding to the image frames F without particular limitations as long as the region of interest ROI is inside of and smaller than the object image I9. For example, in measuring a distance of an object 9 having a fixed position, the sampling control module 151 is arranged to calculate the local average brightness value of a predetermined region of interest at a same position in the image frame F. In other embodiments, the region of interest ROI is dynamically changed.

The sampling parameter Sp is different corresponding to different applications. For example, when the distance measurement system 100 does not include the light source 11, the sampling parameter Sp only includes an exposure time configured to control the image capturing of the image sensor 13. For example, when the distance measurement system 100 includes the light source 11, the sampling parameter Sp includes an exposure time and a light control signal (e.g. the voltage or current signal) configured to respectively control the image capturing of the image sensor 13 and the emission intensity of the light source 11. In other embodiments, the sampling parameter Sp further includes a gain value without particular limitations as long as the sampling parameter Sp is able to change the brightness of the image frame F.

The spatial filtering module 153 calculates a plurality of first object sizes of a converged object image in a converged image frame, and calculates a first average value of the first object sizes, wherein the converged object image is referred to an object image I9 whose average brightness value (e.g. a total average brightness value or a local average brightness value) is converged within a predetermined range or to a predetermined value, and the converged image frame is referred to an image frame F containing the converged object image. For example, it is assumed that in FIG. 4 the image frame F is a converged image frame and the object image I9 therein is a converged object image. The spatial filtering module 153 then calculates a plurality of first object sizes of the converged object image I9. For example, the object 9 is shown as a rectangular object herein for illustration purpose, and the plurality of first object sizes are widths (e.g. transverse widths, longitudinal widths or diagonal widths) of the converged object image I9. For example in FIG. 4, the spatial filtering module 153 calculates image widths W1-W5 (transverse widths being taken as an example herein) corresponding to five pixel rows R1-R5 within a range of the converged object image I9; and then calculates a first average value (W1+W2+W3+W4+W5)/5 of the image widths W1-W5. In this embodiment, as the spatial filtering module 153 calculates a plurality of first object sizes of a same converged image frame F, the calculation is referred to the spatial filtering herein. It should be mentioned that a number of the pixel rows is not limited to five and each pixel row is not limited to a single row of pixels (e.g. more than two rows of pixels is possible) depending on the range of the object image I9 and the calculation accuracy without particular limitations. In other embodiments, when the object image I9 has other shapes rather than the rectangular, other size parameters are used to indicate the first object size, e.g. area, circle radius or the like, as long as the used parameters can represent a size of the object image I9.

When the distance measurement system 100 does not include the temporal filtering module 155, the depth calculation module 157 is configured to compare the first average value with a lookup table to determine an object depth. The lookup table stores the relationship between a plurality of first object sizes (e.g. widths, areas, circle radii or the like) and a plurality of depths as shown in FIG. 5. It is appreciated that, corresponding to different size parameters, the lookup table stored in the storage unit 159 is changed correspondingly.

The temporal filtering module 155 is configured to respectively calculate a second object size of a converged object image in each of a plurality of converged image frames, and calculate a second average value of the second object sizes. For example referring to FIG. 6A, the image frames F1-F5 are five image frames successively captured by the image sensor 13. It is assumed herein that the image frames F1-F5 are converged image frames and the object image I9 therein is a converged object image, wherein the method of determining the object image I9 is illustrated above and thus details thereof are not repeated herein. The temporal filtering module 153 then calculates a plurality of second object sizes corresponding to a plurality of converged object images I9. In this embodiment, the second object sizes are illustrated by transverse widths of the converged object image I9, but the present disclosure is not limited thereto.

Figure 6A:
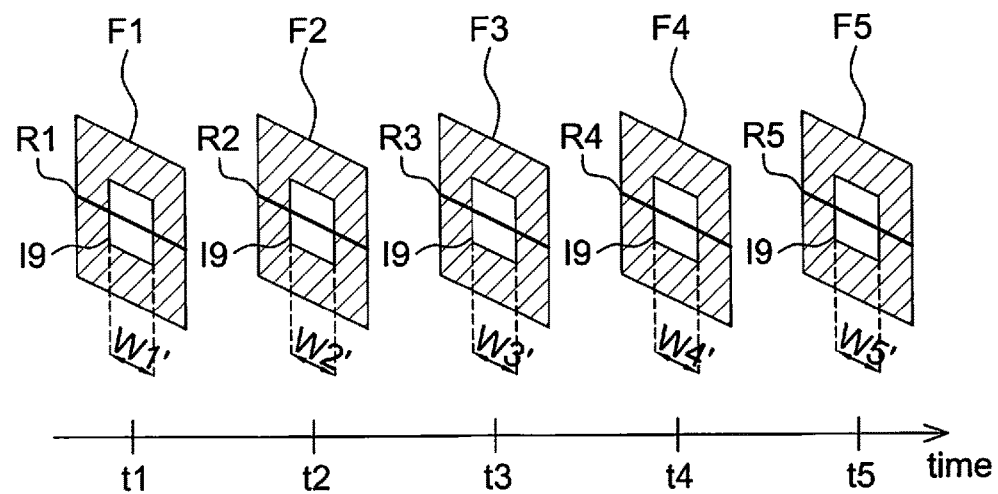
FIGS. 6A-6B are schematic diagrams of the temporal filtering of a distance measurement system according to some embodiments of the present disclosure.

When the distance measurement system 100 does not include the spatial filtering module 153, the temporal filtering module 155 respectively selects a pixel row R1-R5 of each of the converged image frames F1-F5 as shown in FIG. 6A. FIG. 6A is a schematic diagram of the temporal filtering of a distance measurement system according to an embodiment of the present disclosure, wherein areas filled with inclined lines is referred background areas. The temporal filtering module 155 calculates image widths W1'-W5' corresponding to the pixel rows R1-R5 in a range of the converged object image I9 to be served as the second object sizes, and then calculates a second average value (W1'+W2'+W3'+W4'+W5')/5 of the image widths W1'-W5' (i.e. the second object sizes). In this embodiment, as the temporal filtering module 155 calculates a plurality of second object sizes of a plurality of converged image frames F1-F5 captured at different times (e.g. t1-t5), the calculation is referred to the temporal filtering herein. It should be mentioned that a number of the converged image frames is not limited to five and each pixel row is not limited to a single row of pixels (e.g. more than two rows of pixels is possible) depending on the range of the object image I9 and the calculation accuracy without particular limitations. As mentioned above, the second object sizes are not limited to widths of the converged object image I9 and may be represented by other size parameters.

Figure 6B:
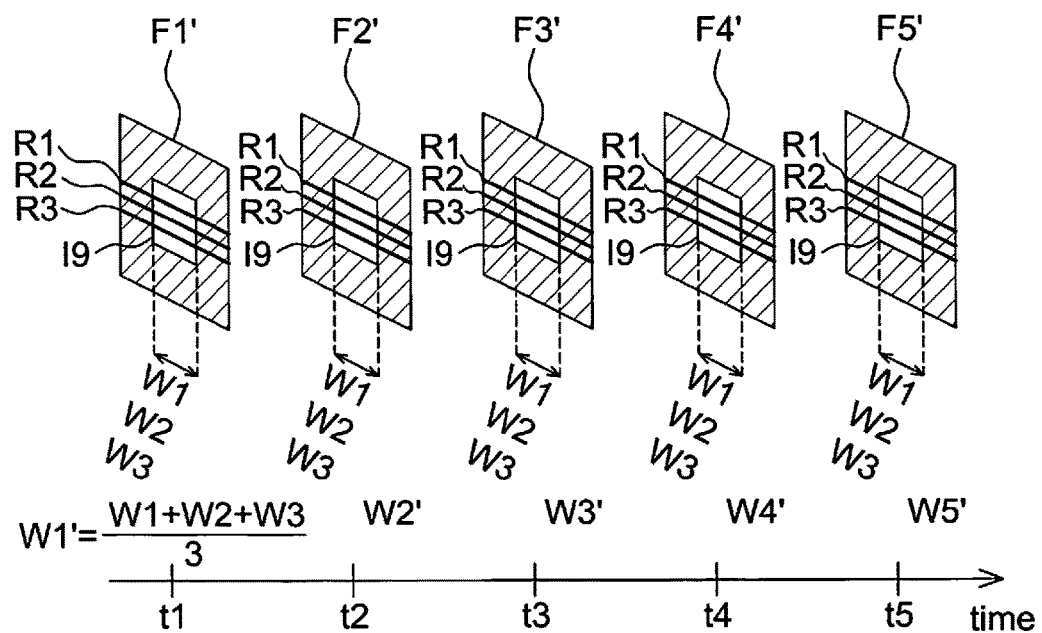

Referring to FIG. 6B, it is another schematic diagram of the temporal filtering of a distance measurement system according to an embodiment of the present disclosure. When the distance measurement system 100 includes the spatial filtering module 153, as mentioned above the spatial filtering module 153 is configured to calculate a plurality of first object sizes W1-W3 of the converged object image I9 in each of a plurality of converged image frames F1'-F5' and calculates a first average value (W1+W2+W3)/3 of the first object sizes W1-W3. FIG. 6B shows that the spatial filtering module 153 calculates image widths W1-W3 (i.e. the first object sizes) corresponding to three pixel rows R1-R3 in a range of the converged object image I9 and an average value thereof. Next, the temporal filtering module 155 calculates a second average value (W1'+W2'+W3'+W4'+W5')/5 of the first average values W1'-W5' corresponding to the converged image frames FP-F5' and takes the second average value as the second object size. More specifically, in this embodiment the temporal filtering module 155 calculates a second average value of a predetermined number of first average values W1'-W5' outputted from the spatial filtering module 153 to be served as the second object size.

Finally, the depth calculation module 157 compares the second average value with a lookup table to determine an object depth. The lookup table stores the relationship between a plurality of second object sizes (e.g. widths, areas, circle radii or the like) and a plurality of depths as shown in FIG. 5. As mentioned above, corresponding to different size parameters, the lookup table stored in the storage unit 159 is changed correspondingly.

More specifically, although FIG. 1 shows that the processor 15 includes both the spatial filtering module 153 and the temporal filtering module 155, it is only intended to illustrate but not to limit the present disclosure. In some embodiments, the processor 15 only includes one of the spatial filtering module 153 and the temporal filtering module 155. The present disclosure is to adjust brightness of the object image I9 to a substantially identical range by adjusting the sampling parameter Sp before calculating the object depth so as to eliminate the influence caused by different surface material of the object 9.

Figure 2:
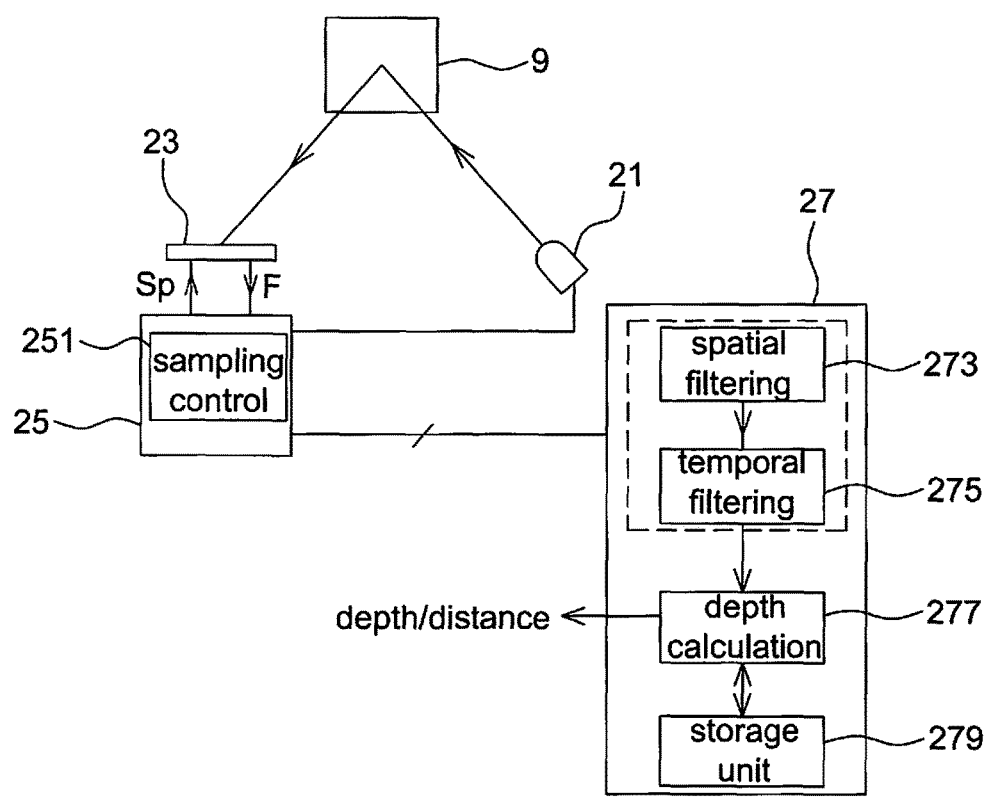
FIG. 2 is a schematic block diagram of a distance measurement system according to an alternative embodiment of the present disclosure.

Referring to FIG. 2, it is a distance measurement system 200 according to another embodiment of the present disclosure. The distance measurement system 200 also includes a light source 21, an image sensor 23, a sampling control module 251, a spatial filtering module 273, a temporal filtering module 275, a depth calculation module 277 and a storage unit 279. The difference between the distance measurement system 200 of this embodiment and the distance measurement system 100 of FIG. 1 is that the distance measurement system 200 includes a slave device 25 and a master device 27 (e.g. a computer system) transmitting data therebetween via a communication interface (e.g. a wired interface or a wireless interface). The slave device 25 is configured to capture and output converged image frames, and the master device 27 is configured to post-process the converged image frames for calculating the object depth/distance and performing following applications. However, in the distance measurement system 100 of FIG. 1, the spatial filtering module 153, the temporal filtering module 155, the depth calculation module 157 and the storage unit 159 are in the same processor 15.

In FIG. 2, the slave device 25 includes the sampling control module 251 which is also configured to control a sampling parameter Sp to allow an average brightness value of an object image in the image frame captured by the image sensor 23 to be converged within a predetermined range or to a predetermined value. In one embodiment, the sampling control module 251 is, for example, included in a digital signal processor (DSP).

In this embodiment, if an average brightness value (e.g. a total average brightness value or a local average brightness value) of the object image I9 is not converged, the slave device 25 does not output the image frame F to the master device 27. In other words, in this embodiment the slave device 25 only outputs the converged image frame to the master device 27.

In FIG. 2, the master device 27 includes the spatial filtering module 273, the temporal filtering module 275, the depth calculation module 277 and the storage unit 279 to calculate the object depth/distance using the same way as the spatial filtering module 153, the temporal filtering module 155, the depth calculation module 157 and the storage unit 159 of FIG. 1 mentioned above.

In one embodiment, the slave device 25 and the image sensor 23 are disposed in a same chip package. In another embodiment, the slave device 25 is disposed in a portable electronic device, a wearable electronic device, a home appliance or a vehicle device, and configured to capture and output converged image frames to the master device 27 for post-processing.

In FIG. 2, operations of the sampling control module 251, the spatial filtering module 273, the temporal filtering module 275 and the depth calculation module 277 are identical to those of the sampling control module 151, the spatial filtering module 153, the temporal filtering module 155 and the depth calculation module 157 of FIG. 1 and thus details thereof are not repeated herein.

Figure 3:
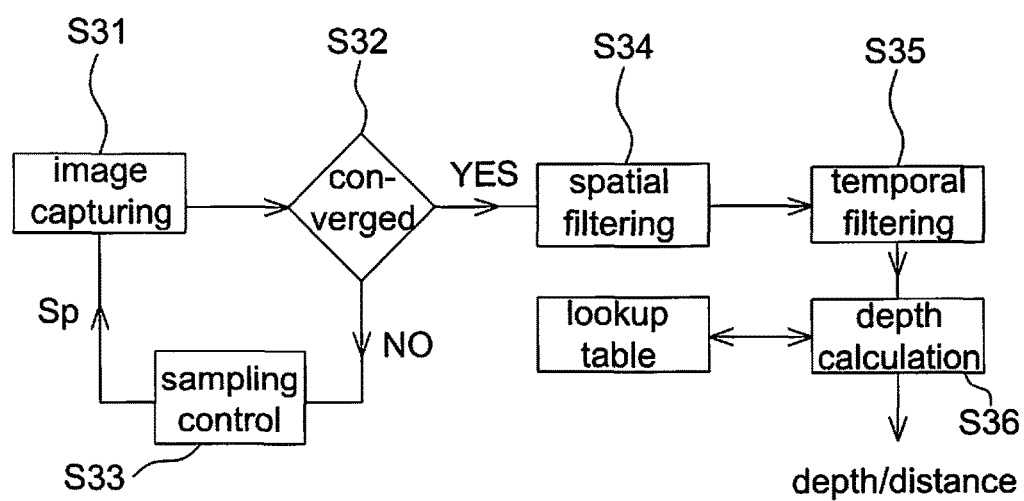
FIG. 3 is a flow chart of an operating method of a distance measurement system according to an embodiment of the present disclosure.

Referring to FIG. 3, it is a flow chart of an operating method of a distance measurement system according to an embodiment of the present disclosure, which is applicable to the distance measurement systems 100 and 200 of FIGS. 1-2. The operating method includes the steps of successively capturing image frames with an image sensor (Step S31); identifying whether the image frames are converged (Step S32); controlling a sampling parameter to converge an average brightness value of an object image in the image frames to be within a predetermined range (Step S33); calculating a plurality of first object sizes of a converged object image in a converged image frame and calculating a first average value of the first object sizes (Step S34); calculating a second average value of the first average values corresponding to a plurality of converged image frames (Step S35); and comparing the second average value with a lookup table to determine an object depth (Step S36). As mentioned above, in some embodiments the distance measurement systems 100 and 200 only include one of the spatial filtering module and the temporal filtering module, and thus only one of the Steps S34 and S35 is performed.

Referring to FIGS. 1 and 3-6B, details of the operating method of this embodiment are illustrated below. For illustration purpose, the distance measurement system 100 of FIG. 1 is taken as an example herein. When the operating method is applied to FIG. 2, the slave device 25 has to transmit the converged image frames to the master device 27 via a communication interface.

Step S31: The image sensor 13 successively captures, for example at a sampling frequency, image frames F to be outputted to the processor 15. The light source 11 provides light required by the image sensor 13 in capturing the image frames F.

Steps S32-S33: The processor 15 (e.g. the sampling control module 151) then identifies whether an average brightness value of an object image I9 in the image frames F is converged to be within a predetermined range or to a predetermined value. As mentioned above, the average brightness value is a total average brightness value or a local average brightness value of the object image I9. Therefore, when the local average brightness value is used, the processor 15 further selects a region of interest ROI in the object image I9. When the average brightness value is not converged, the sampling parameter Sp is adjusted and a new image frame F is captured till an average brightness value of the object image I9 in the captured image frame F is converged to be within the predetermined range or to the predetermined value. As mentioned above, the sampling parameter Sp is different according to different applications. When the average brightness value is converged, the Step S34 is entered.

Step S34: The processor 15 (e.g. the spatial filtering module 153) calculates a plurality of first object sizes W1-W5 of a converged object image I9 in a converged image frame F as shown in FIG. 4, and calculates a first average value (W1+W2+W3+W4+W5)/5 of the first object sizes W1-W5. If the distance measurement system 100 does not include the temporal filtering module 155, the processor 15 (e.g. the depth calculation module 157) directly enters the Step S36 to compare the first average value with the previously stored lookup table (as shown in FIG. 5) to obtain an object depth/distance. If the distance measurement system 100 includes the temporal filtering module 155, the Step S35 is entered.

Step S35: If the distance measurement system 100 does not include the spatial filtering module 153, the processor 15 (e.g. the temporal filtering module 155) respectively calculates a second object size W1'-W5' of a converged object image I9 in each of a plurality of converged image frames F1-F5, and calculates a second average value (W1'+W2'+W3'+W4'+W5')/5 of the second object sizes W1'-W5' as shown in FIG. 6A. If the distance measurement system 100 includes the spatial filtering module 153, the processor 15 (e.g. the temporal filtering module 153) calculates a second average value (W1'+W2'+W3'+W4'+W5')/5 of the first average value W1'-W5' corresponding to a plurality of converged image frames F1'-F5' as shown in FIG. 6B.

Step S36: Finally, the processor 15 (e.g. the depth calculation module 157) compares the second average value with a lookup table (as shown in FIG. 5) to determine an object depth/distance.

As mentioned above, the conventional distance measurement system can be influenced by the material of an object to be detected to cause the depth jitter in operation. Therefore, the present disclosure provides a distance measurement system (FIGS. 1 and 2) and an operating method thereof (FIG. 3) that change the image brightness of an object to be detected to be within a predetermined brightness range or to a predetermined value by adjusting the sampling parameter, and then calculate an object size according to the converged object image being filtered. Finally, a detected depth/distance is outputted by checking a lookup table so as to eliminate the influence from the material of the object to be detected.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A distance measurement system, comprising:
   an image sensor configured to successively capture image frames;
   a sampling control module configured to control a sampling parameter to change an average brightness value of an object image of an object in the image frames to be converged within a predetermined range;
   a spatial filtering module configured to calculate a plurality of object sizes of the object image with the converged brightness value in a same image frame at first and then calculate an average value of the calculated object sizes; and
   a depth calculation module configured to compare the average value with a lookup table to determine an object depth of the object.

2. The distance measurement system as claimed in claim 1, wherein the sampling parameter comprises an exposure time of the image sensor.

3. The distance measurement system as claimed in claim 1, wherein the distance measurement system further comprises a light source, and the sampling parameter comprises an exposure time of the image sensor and a light control signal for controlling the light source.

4. The distance measurement system as claimed in claim 1, wherein the sampling control module is further configured to select a region of interest in the object image, and the average brightness value is a local average brightness value of the region of interest.

5. The distance measurement system as claimed in claim 4, wherein the region of interest is a predetermined fixed region corresponding to the image frames.

6. The distance measurement system as claimed in claim 1, wherein the object sizes are widths of the converged object image.

7. A distance measurement system, comprising:
an image sensor configured to successively capture image frames;
a sampling control module configured to control a sampling parameter to change an average brightness value of an object image of an object in the image frames to be converged within a predetermined range;
a temporal filtering module configured to respectively calculate a second object size of the object image with the converged brightness value in each of a plurality of image frames captured at different times at first and then calculate a second average value of the calculated second object sizes; and
a depth calculation module configured to compare the second average value with a lookup table to determine an object depth of the object.

8. The distance measurement system as claimed in claim 7, wherein the sampling parameter comprises an exposure time of the image sensor.

9. The distance measurement system as claimed in claim 7, wherein the distance measurement system further comprises a light source, and the sampling parameter comprises an exposure time of the image sensor and a light control signal for controlling the light source.

10. The distance measurement system as claimed in claim 7, wherein the sampling control module is further configured to select a region of interest in the object image, and the average brightness value is a local average brightness value of the region of interest.

11. The distance measurement system as claimed in claim 10, wherein the region of interest is a predetermined fixed region corresponding to the image frames.

12. The distance measurement system as claimed in claim 7, wherein the second object sizes are widths of the converged object image.

13. The distance measurement system as claimed in claim 7, wherein the distance measurement system further comprises a spatial filtering module configured to calculate a plurality of first object sizes of the converged object image in each of the plurality of image frames captured at the different times and calculate a first average value of the first object sizes to be configured as the second object sizes.

14. The distance measurement system as claimed in claim 13, wherein the first object sizes are widths of the converged object image.

15. An operating method of a distance measurement system, the distance measurement system comprising an image sensor, the operating method comprising:
successively capturing image frames with the image sensor;
controlling a sampling parameter to change an average brightness value of an object image of an object in the image frames to be converged within a predetermined range;
calculating a plurality of first object sizes of the object image with the converged brightness value in a same image frame at first and then calculating a first average value of the calculated first object sizes;
calculating a second average value of the calculated first average values corresponding to a plurality of image frames captured at different times and containing the object image with the converged brightness value; and
comparing the second average value with a lookup table to determine an object depth of the object.

16. The operating method as claimed in claim 15, wherein the sampling parameter comprises an exposure time of the image sensor.

17. The operating method as claimed in claim 15, wherein the distance measurement system further comprises a light source, and the sampling parameter comprises an exposure time of the image sensor and a light control signal for controlling the light source.

18. The operating method as claimed in claim 15, further comprising:
selecting a region of interest in the object images, wherein the average brightness value is a local average brightness value of the region of interest.

19. The operating method as claimed in claim 18, wherein the region of interest is a predetermined fixed region corresponding to the image frames.

20. The operating method as claimed in claim 15, wherein the first object sizes are widths of the converged object image.

* * * * *